(12) United States Patent
Hüttig et al.

(10) Patent No.: US 6,241,457 B1
(45) Date of Patent: Jun. 5, 2001

(54) STACKING APPARATUS FOR A THERMOFORMING MACHINE

(75) Inventors: Jörg Hüttig, Lübeck; Frank-Michael Wölk, Klempau, both of (DE)

(73) Assignee: Gabler Maschinenbau GmbH, Lubeck (DE)

( * ) Notice: Subject to any disclaimer, the term of this patent is extended or adjusted under 35 U.S.C. 154(b) by 0 days.

(21) Appl. No.: 09/248,085

(22) Filed: Feb. 9, 1999

(30) Foreign Application Priority Data

Feb. 11, 1998 (DE) .......................................... 298 02 318 U

(51) Int. Cl.⁷ .................................................. B65B 35/50
(52) U.S. Cl. .................................. 414/788.2; 414/794.9; 414/795.2; 414/27; 425/289
(58) Field of Search .............................. 414/788.2, 798.9, 414/794.9, 795.2, 795, 798.5, 27, 788.1, 795.3; 425/289, 298, 398

(56) References Cited

U.S. PATENT DOCUMENTS

| | | | |
|---|---|---|---|
| 3,499,063 | * | 3/1970 | Ninneman et al. .................. 414/786 |
| 3,759,303 | * | 9/1973 | Henrich et al. ........................... 141/1 |
| 3,802,819 | * | 4/1974 | Alroy .................................... 425/135 |
| 3,884,366 | * | 5/1975 | Leenards ............................ 214/6 BA |
| 4,054,212 | * | 10/1977 | Mueller ............................... 214/8.5 A |
| 4,565,513 | * | 1/1986 | Kiefer .................................... 425/289 |
| 4,805,758 | * | 2/1989 | Dominico et al. .................... 198/444 |
| 5,122,029 | * | 6/1992 | DelDuca ............................. 414/789.2 |
| 5,192,181 | * | 3/1993 | Bryde-Hansen .................. 414/795.3 |
| 5,232,325 | * | 8/1993 | Kohn et al. .............................. 414/27 |
| 5,234,313 | * | 8/1993 | DelDuca ................................ 414/786 |
| 5,273,167 | * | 12/1993 | Haas et al. ............................ 209/591 |
| 5,704,194 | * | 1/1998 | Niehaus .................................. 53/415 |
| 5,797,720 | * | 8/1998 | Ruh .................................... 414/788.2 |
| 5,888,046 | * | 3/1999 | Salda et al. ........................ 414/788.2 |

FOREIGN PATENT DOCUMENTS

| | | | |
|---|---|---|---|
| 2517981 | * | 4/1976 | (DE) . |
| 2716680 | * | 6/1978 | (DE) . |
| 33 46 628C2 | | 7/1985 | (DE) . |

* cited by examiner

Primary Examiner—Joseph A. Fischetti
(74) Attorney, Agent, or Firm—Herbert Dubno

(57) ABSTRACT

A stacking apparatus for a thermoforming machine with a guide bar for a slider of a pivot arm which can be swung between positions along the pivot arm to pick up containers or covers and to deliver stacks of the containers in horizontal orientation to a receiving plate or conveyor. In another position of the guide bar, the pivot arm delivers the stacks of articles to the receiving table or conveyor in upright columns.

14 Claims, 11 Drawing Sheets

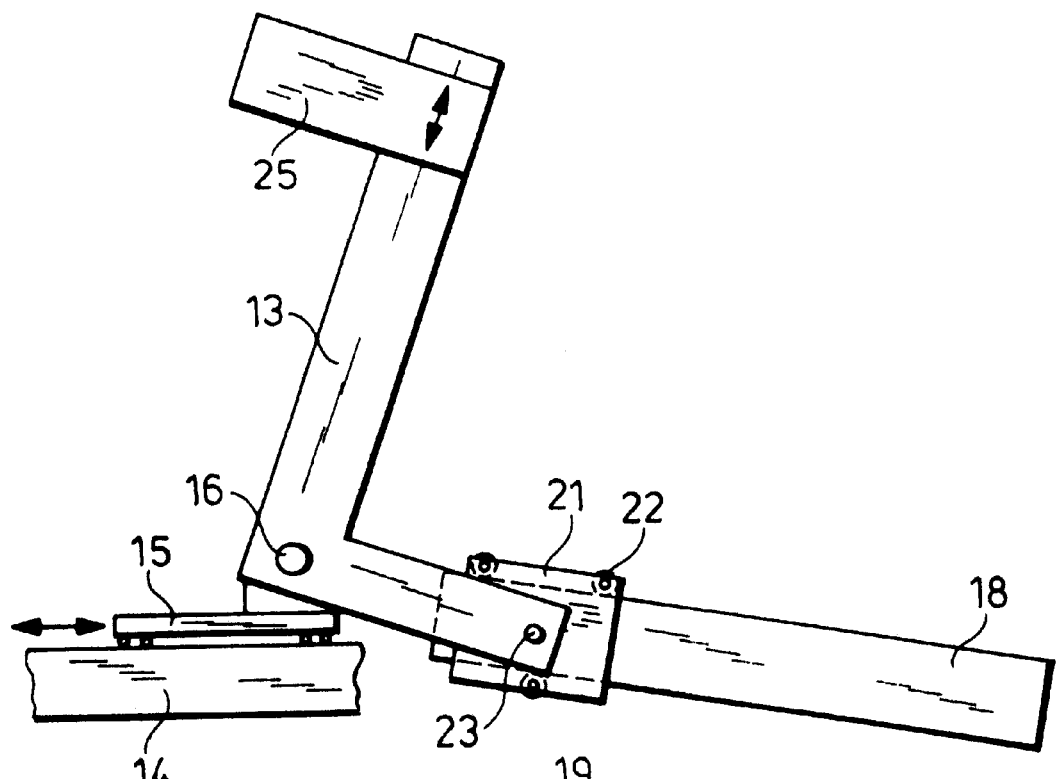
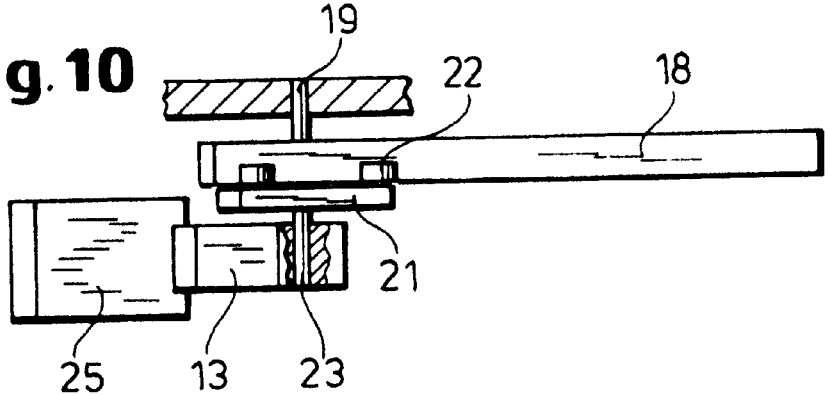

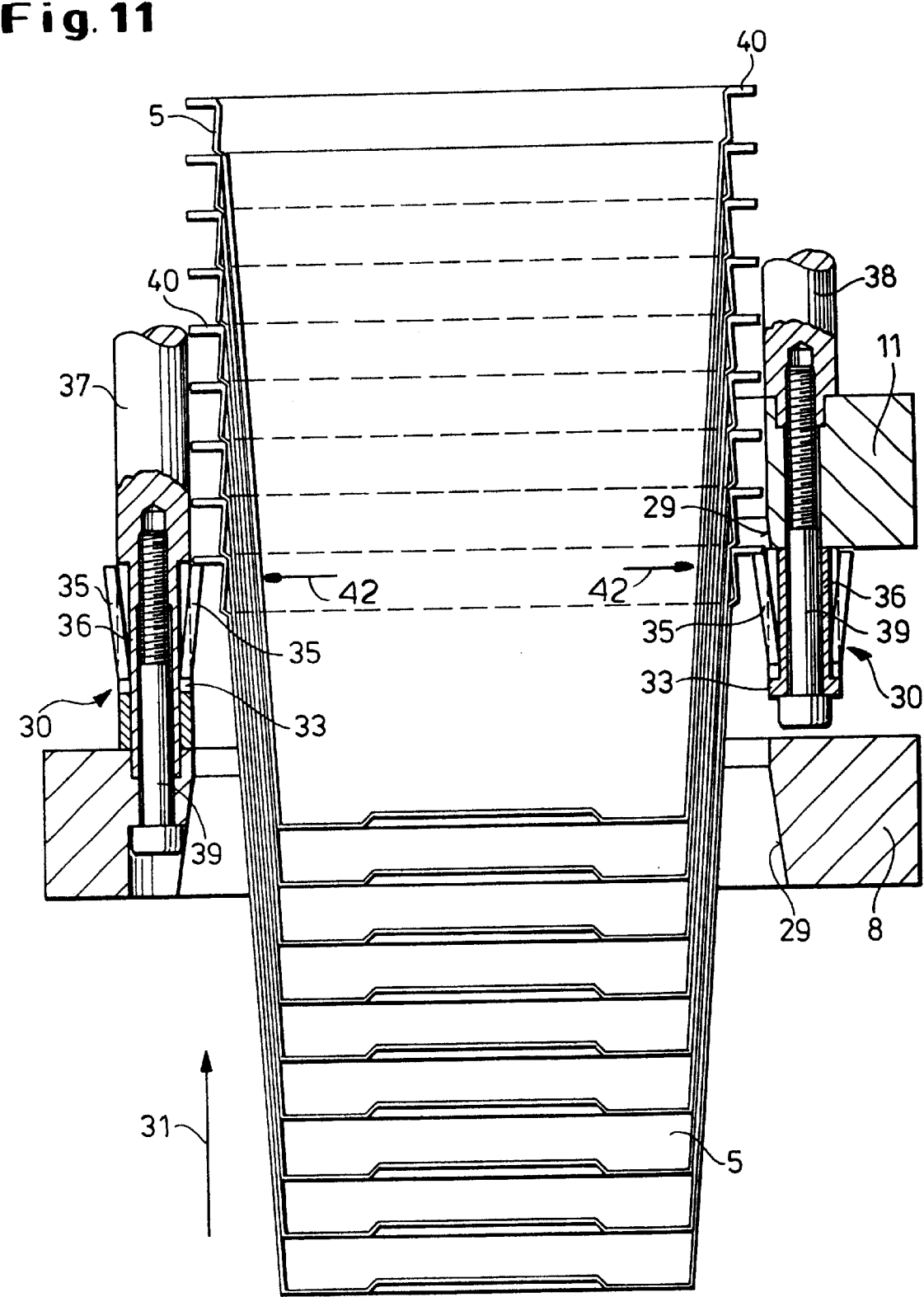

STACKING APPARATUS FOR A THERMOFORMING MACHINE

SPECIFICATION

1. Field of the Invention

Our present invention relates to a stacking apparatus for a thermoforming machine which comprises a fixed upper-forming die, a movable lower-forming die between which a foil can be disposed, an intermittent foil transport arrangement and a heating arrangement whereby articles such as cups and covers can be deep-drawn from the foil in the forming dies and, in particular, wherein the lower-forming die can operationally be raised and lowered and/or swung out of a position in which it is juxtaposed with the upper die to enable the article formed from the thermoplastic synthetic resin to be removed and stacked. More particularly, the invention relates to a stacking apparatus for the purposes described which can be selectively used for the stacking of cup-like and cover-like articles produced in a thermoforming machine.

2. Background of the Invention

A thermoforming machine of the type described has been illustrated in German patent document DE-C 233 46 628. Such machines can have forming dies which can be relatively moved toward one another and apart to produce plastic articles such as margarine containers, beverage cups, container covers, trays and the like from a thermoplastic synthetic resin foil and from composite foils.

In the machine, in a closed position of the upper and lower-forming dies, the articles are shaped and then punched from the foil and transported in the open position of the forming dies into a stacking unit. The upper-forming die of such a thermoforming machine is mounted on a rigid traverse member while the lower-forming die is fixed on a forming table which can be vertically disposed and is also swingable relative to the upper-forming die. The swingability of the forming table is ensured by providing the forming table with trunnions whose bearings are guided in respective vertical guides. The forming table drive utilizes a cam follower which is coupled to the forming table by a lever linkage and which rides on a cam disk rotatable with a main shaft of the apparatus.

In the stacking operation, to ensure that the articles will not interfere with the foil transport or vice versa, comparatively large pivoting angles between about 45° and 90° and typically of around 80°, must be used. The ejected articles must be collected on a stacking plate which is moved toward the lower-forming die to avoid the danger that the article will have excessive free fall gravitationally and fail to meet the opening provided in the stacking plate or become damaged. An alternative arrangement which involves providing a lower stacking plate, has also not been successful since the article may change in position along the way to the stacking plate. Finally an alternative in which the article is picked up by suction at the ejector has the drawback that it complicates the construction of the ejector and requires a relatively expensive vacuum system which might otherwise not be required.

OBJECTS OF THE INVENTION

It is, therefore, the principal object of the present invention to provide an improved stacking apparatus for a thermoforming machine, especially of the type described, which is free from the drawbacks mentioned and can operate with a minimum danger of alteration in the orientation of the articles produced and which does not require a vacuum unit.

Another object of this invention is to provide an improved stacking system for a thermoforming machine which affords better cooperation with the thermoforming machine than earlier systems.

It is also an essential object of the invention to provide a stacking apparatus for a thermoforming machine which can be varied to accommodate thermoformed articles of a variety of geometries, like cups, trays, covers, shells or the like and which also is of simple construction, high reliability and operable at high production rates.

SUMMARY OF THE INVENTION

These objects and others which will become apparent hereinafter are attained, in accordance with the invention in a stacking apparatus for a thermoforming machine having an intermittent foil transport, a preferably fixed upper-forming die, and a lower-forming die which is preferably swingable out of alignment with the upper-forming die and from the forming position in which the dies are aligned with one another for producing selectively a series of deep-drawn, cup-like articles, hereinafter referred to as cups, and cover-like articles, hereinafter referred to broadly as covers. According to the invention, the stacking apparatus comprises:

a stacking-apparatus support;

a lower stacking plate on the support for receiving deep-drawn articles produced by the thermoforming machine;

an upper stacking plate adapted to be juxtaposed with the lower stacking plate and complementary thereto for receiving deep-drawn articles from the lower stacking plate and for retaining a column of the articles;

a pivot arm carrying the upper stacking plate, the upper stacking plate being raisable and lowerable on the pivot arm;

a carriage to which the pivot arm is articulated for swingable movement about an arm pivot, the carriage having guide rollers;

a guide bar swingably mounted at a horizontal pivot axis on the support and engaged by the rollers for guiding the carriage therealong whereby a column of the articles on the upper stacking plate is swingable from a position wherein the articles are collected from the lower stacking plate into a position in which the articles are deposited on a surface; and means for securing the guide bar selectively in a first angular position about the horizontal pivot axis in which the upper stacking plate is constrained to deposit columns of the covers forming the articles in a vertical orientation on the surface and columns of the cups forming the articles in a horizontal orientation on the surface.

More specifically, the articles ejected from the thermoforming machine are picked up by a lower stacking plate which has an upper stacking plate complementary thereto and raisable and lowerable in a displaceable pivot arm. The pivot arm is swingable in a slider provided with guide rollers which ride a lever-like guide bar itself adjustable between two positions or respective orientations with respect to a horizontal axis, in one position of which collected cups can be deposited in a horizontal position whereas in a second position of that bar, covers are deposited so that the stacks thereof are vertical.

The stacking apparatus of the invention can be retrofitted on existing thermoforming machines, preferably on thermoforming machines of the type described in German patent document 197 16 655 which provides an inclined thermoforming machine in which the ejected articles are picked up in an inclined orientation. The stacking apparatus can be used for collecting containers and cups in a universal manner from thermoforming machines for making such containers or cups.

With the system of the invention, depending upon the geometric configuration of the articles produced (containers or trays on the one hand or covers and shells on the other), the articles can be deposited in a horizontal orientation or a vertical orientation and the orientation on deposition can be matched to the requirements of further processing, e.g. the finishing program. The switchover can be effected by only a simple manual resetting of the position of the guide bar so that the latter is either in its upper or lower positions and can be arrested in either. The arresting element may be a detent or catch arrangement provided directly on the bar. When the stacking apparatus is used with a vertical thermoforming machine, the finished articles can be transported from the thermoforming machine in a foil grid and picked up by the stacking apparatus During the operation of the pivot arm, the latter is constrained to swing either into a horizontal orientation or into a vertical orientation after the articles have been picked up from their inclined positions, to deposit respective collections of articles on the receiving plate in horizontal collections or stacks or vertical collections or stacks depending upon whether articles are cups or covers, the number of such collections transferred in each stroke depending, of course, upon the number of forming cavities of the lower-forming die.

The retention of the guide bar in its upper operating position constrains the pivot arm, according to the invention upon swinging from its inclined orientation to take up the covers, into a vertical orientation in which the upper stacking plate can be moved vertically to deposit the covers on the receiving table.

When the guide bar is retained in its inclined position, after the upper stacking plate has picked up the cups in the inclined orientation of the pivot arm, it is constrained to move into a horizontal position wherein the upper stacking plate lies in a vertical plane and the columns of articles can be deposited in a horizontal orientation on the receiving table.

When the guide bar is retained in its inclined position, after the upper stacking plate is picked up, the cups in the inclined orientation of the pivot arm, it is constrained to move into a horizontal position wherein the upper stacking plate lies in a vertical plane and the columns of articles can be deposited in a horizontal orientation on the receiving table. The orientations of the pivot arm are ensured by the slider which is displaceable along the guide bar on the guide rollers carried by the slider. Since simultaneously swinging of the slide arm a displacement of the upper stacking plate therealong and in general the travel of the pivot arm may have to deal with heavy loads on the pivot arm and the upper stacking plate, the pivot arm and stacking plate displacements are preferably motorized.

According to a feature of the invention, a pusher is juxtaposed with the pivot arm which can displace the article stacks onto the receiving table or a conveyor belt, i.e. horizontally in the case of cups or can displace the stacks of covers onto a conveyer where appropriate.

The upper stacking plate which is motor driven on the pivot arm and can be raised and lowered, permits displacement of the stack in the direction of the receiving table or conveyor by the upper stacking plate so that the stroke and length of the pusher in the same direction can be relatively small.

When the stacking apparatus is set in operation with covers, the article stacks can initially be deposited upon a so-called finger plate which enables the motor-driven stacking plate to be further lowered so that the stacking plate is not in the path of the pusher which displaces the article stacks after they have been deposited on the receiving plate.

According to a further feature of the invention, the upper and lower stacking plates are formed with automatic article retainers of an elastic material and with radially-displaceable formations. The formations in each cavity of the stacking plate can be distributed around the periphery thereof and hence a plurality of such formations can be provided for each cavity. These retainers or lifters can be formed as tubular funnel-shaped sleeves widening in the direction of stacking of the respective articles and each of the sleeves can be formed with a plurality of slits defining outwardly-projecting lamellae between them, the slits running from one end of each sleeve of a cylindrical continuous portion at the opposite end thereof. The lifters of each stacking plate cavity has its elastic formations so positioned that as the cup is pressed into the cavity or opening in the stacking plate, the formations are pushed together until the collar-like container edge comes to lie above the lifter. Then the lifters can spread outwardly and engage below the container rim. The same reliable stack retention or article retention can be achieved, for example, in the case of very soft and yieldable covers by deforming the article somewhat and permitting the lifter to spring past the article so that the lifter engages the article from below.

The cylindrical continuous portion and the vertical shells of the sleeves between the projecting lamellae stabilizes the assembly of the stack. According to another feature of the invention, control means is provided for counting the number of articles accumulated in a respective column and actuating the pivot arm upon the count reaching a predetermined number. When the thermoforming machine has a programmable controller with a memory, the control means can form part of the programmable controller. This permits integration of the formation of the stacks with the production of the individual articles and, in addition, association of the apparatus with accessories such as machines for packaging the stacks or the like.

BRIEF DESCRIPTION OF THE DRAWING

The above and other objects, features, and advantages will become more readily apparent from the following description, reference being made to the accompanying drawing in which:

FIG. 9 is a detail, highly diagrammatic in form, of the mechanism for displacing the pivot arm;

FIG. 10 is a view similar to FIG. 9 showing the mechanism in a direction perpendicular to the plane of the view of FIG. 9;

FIG. 11 is a detail through a cavity in the upper stacking plate showing the retaining elements therein in engagement with cups;

SPECIFIC DESCRIPTION

Figure 1:
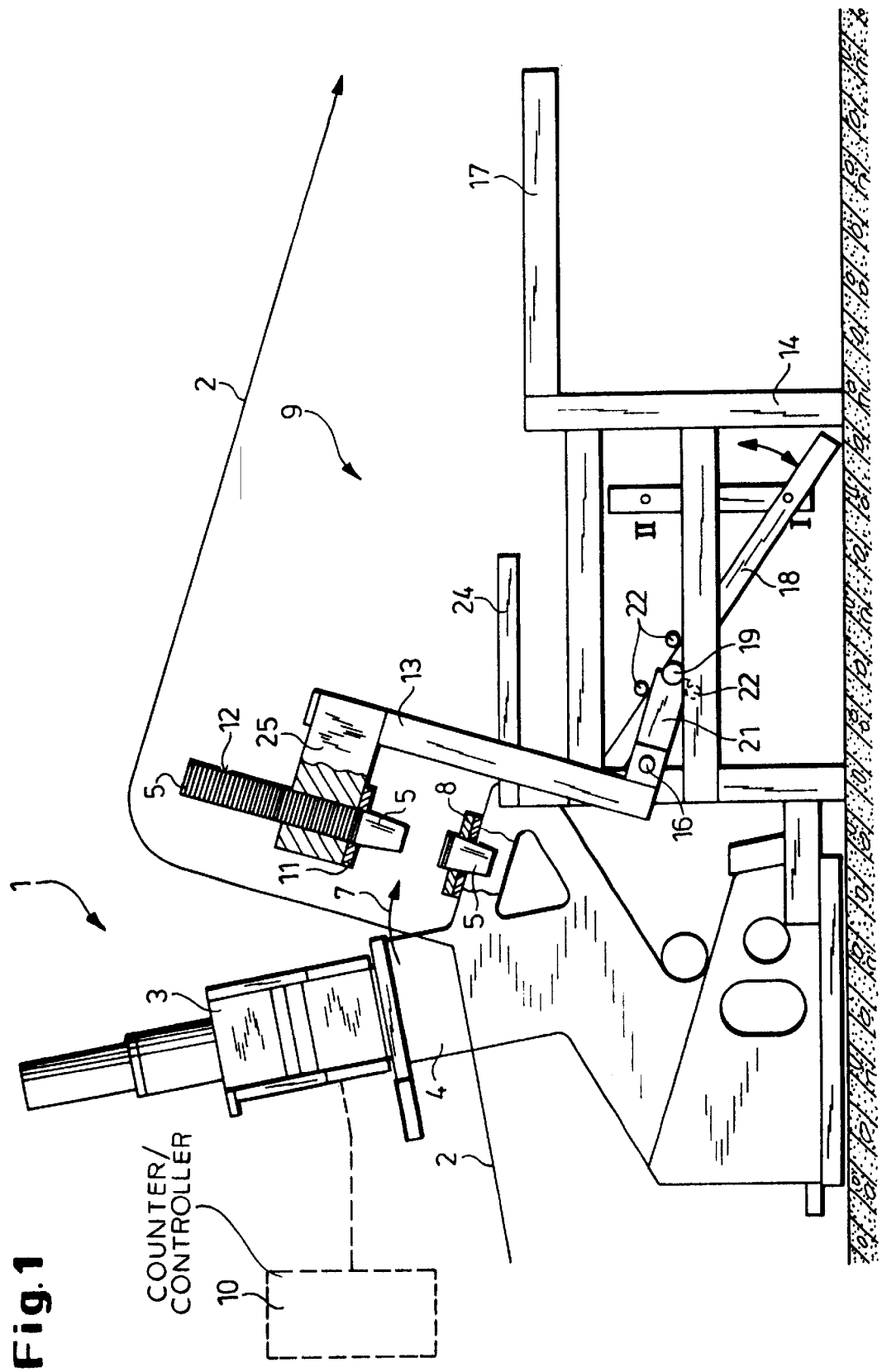
FIG. 1 is a diagrammatic side elevational view of a thermoforming machine having a stacking apparatus in accordance with the invention and set up in the stacking of containers, the upper stacking plate being partially broken away and the pivot arm being shown in its inclined position in which it accumulates the cups from the lower stacking plate.

The thermoforming machine 1 shown in FIGS. 1–7 has at one side thereof a source of a thermoplastic synthetic resin foil web 2 which travels through the machine in the direction of the arrow, the foil being taken up by a take-up roller at the downstream side of the system. The foil path has been shown generally in the drawing and the foil actually passes between a fixed upper-forming die 3 and a lower-forming die 3 which can be swung out of alignment with the fixed forming die 4, e.g. in the direction of the arrow 7. Before passing between the forming dies 3, 4, the foil web is heated in a heating station to soften the foil.

The forming dies 3 and 4 are provided with a multiplicity of die cavities in which the hollow articles which are deep-drawn in the thermoforming machine are shaped. The articles may be cups 5 (see FIGS. 1–3) or covers (see FIGS. 4–7), and the articles are not only shaped in the forming cavities, but are stamped from the material of the web and can be ejected from the cavities in the conventional manner. When the articles are formed, the lower-forming die 4 is swung in the direction of arrow 7 into the stacking region and the stacks of covers 6 or cups 5 are engaged in a lower stacking plate 8 of the thermoforming machine. The lower-forming plate 8 is juxtaposed with an upper-forming plate 11 which is complementary to the lower-forming plate in that it has cavities and retainers corresponding to the cavities of the lower-forming plate into which the cups are transferred after their fabrication. An article counter 9 serves to count the number of articles accumulated in a stack and is connected to the programmed control 10 as will be described in greater detail hereinafter.

The thermoforming machine is oriented at an angle of about 10° to the ground so that the removal of the finished articles from the lower-forming die 4 and their transfer to the lower stacking plate can be effected in an approximately vertical manner. The controller 10, which uses a hierarchical method, is only shown schematically in broken lines and has a program stored therein. As soon as the programmed number of articles has collected in the lower-stacking plate 8, an upper complementary stacking plate is lowered onto it and receives the corresponding stacks 12 of articles which are fitted one into the other and removes the article stacks from the cavities of the lower stacking plate.

Figure 8:
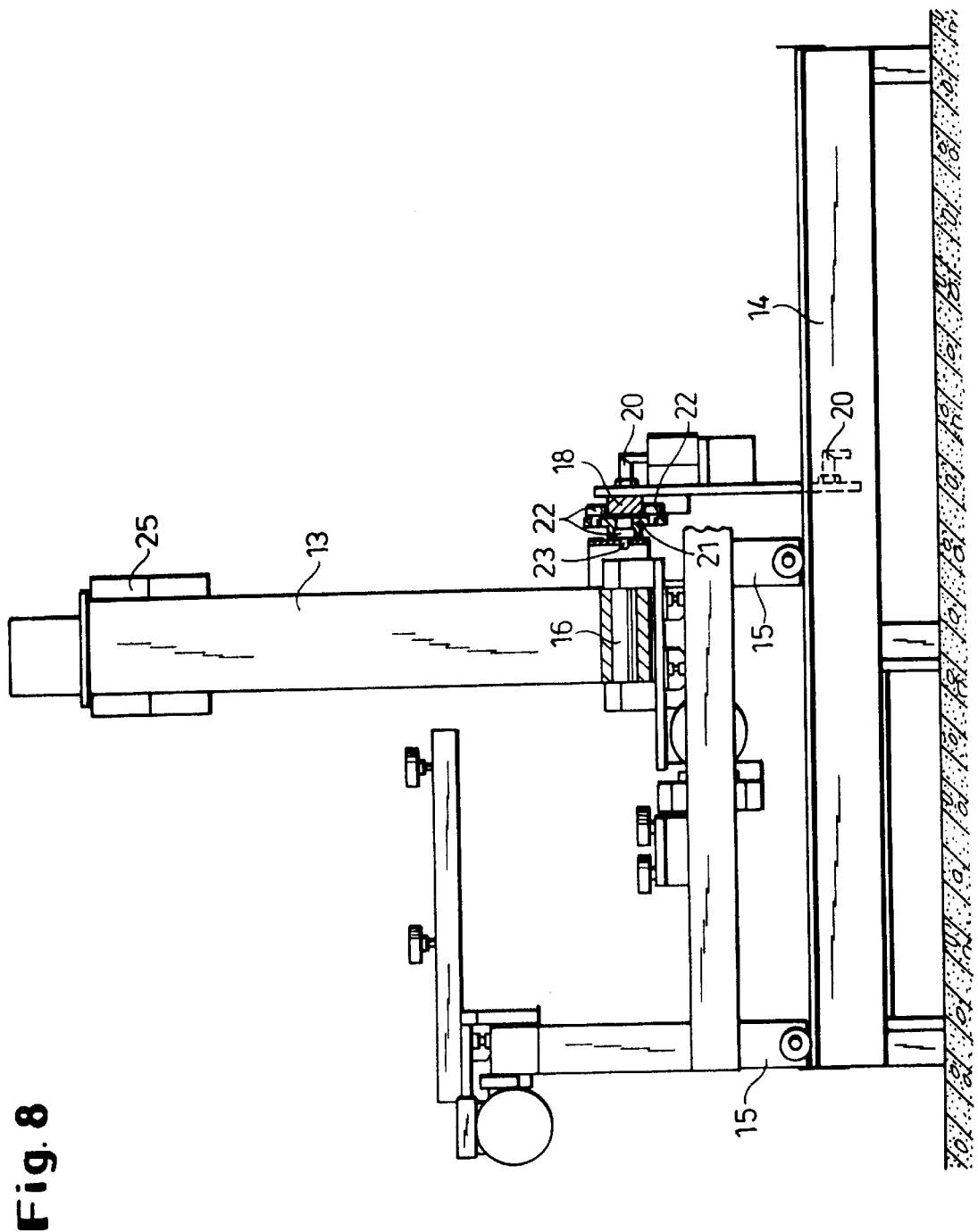
FIG. 8 is a detail of the stacking apparatus of FIGS. 1–7 showing the pivot arm in a vertical position.

The upper stacking plate 11 can be raised and lowered on a pivot arm 13 which is swingable in a base 14 in which the stacking unit is displaceable on a stacking frame 15. The stacking frame 15 is a carriage horizontally displaceable on the base 14 (see FIG. 8). In FIG. 9 the carriage 15 has been shown only diagrammatically. The arm 13 is swingable about a horizontal axis 16 (compare FIGS. 6 and 9).

Figure 2:
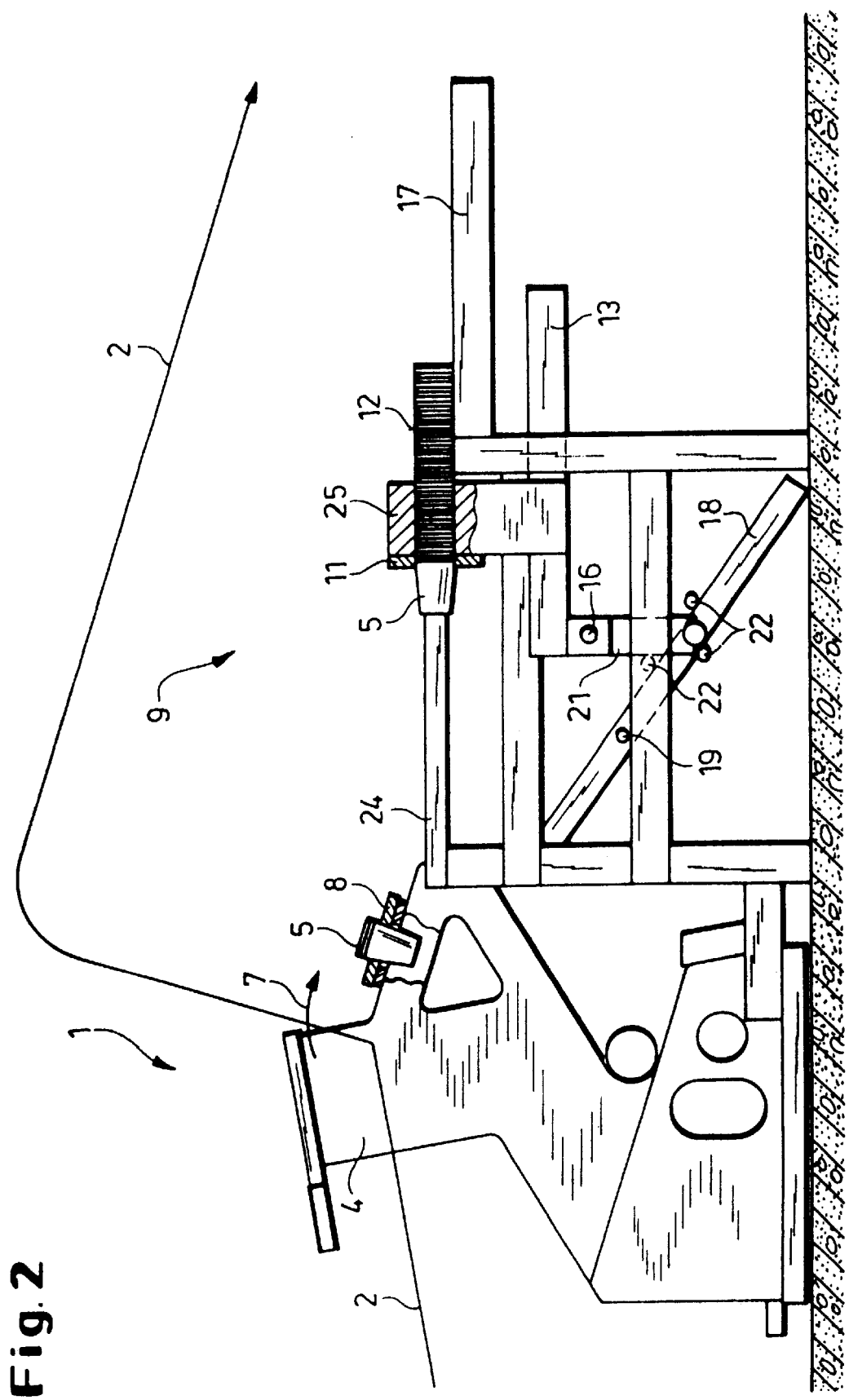
FIG. 2 is a view similar to FIG. 1 showing the apparatus in the position in which a cup stack is about to be deposited upon the receiving plate or conveyor.

To deposit the stacks of receptacles on the receiving table or plate 17, the pivot arm 13 can be displaced from the position shown in FIG. 1 in which the receptacles are picked up by the pivot arm and the upper plate 11 and the position shown in FIG. 2 in which the stacks of cups 5 can be pushed out of the holes in the upper die plate 11.

Figure 3:
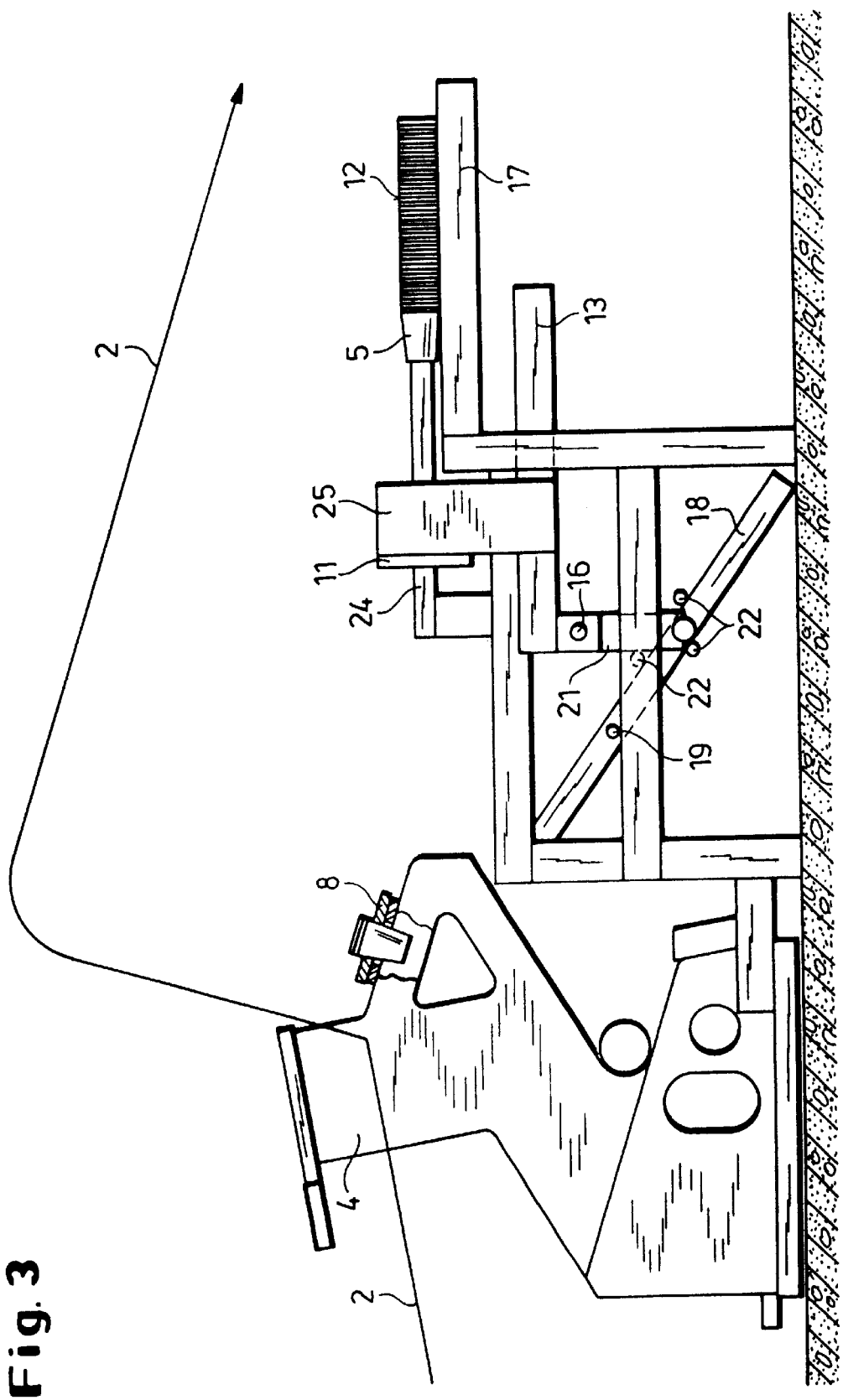
FIG. 3 is a view similar to FIG. 1 showing a position of the apparatus following that of FIG. 2, i.e. after the container stack has been displaced out of the upper stacking plate.
Figure 4:
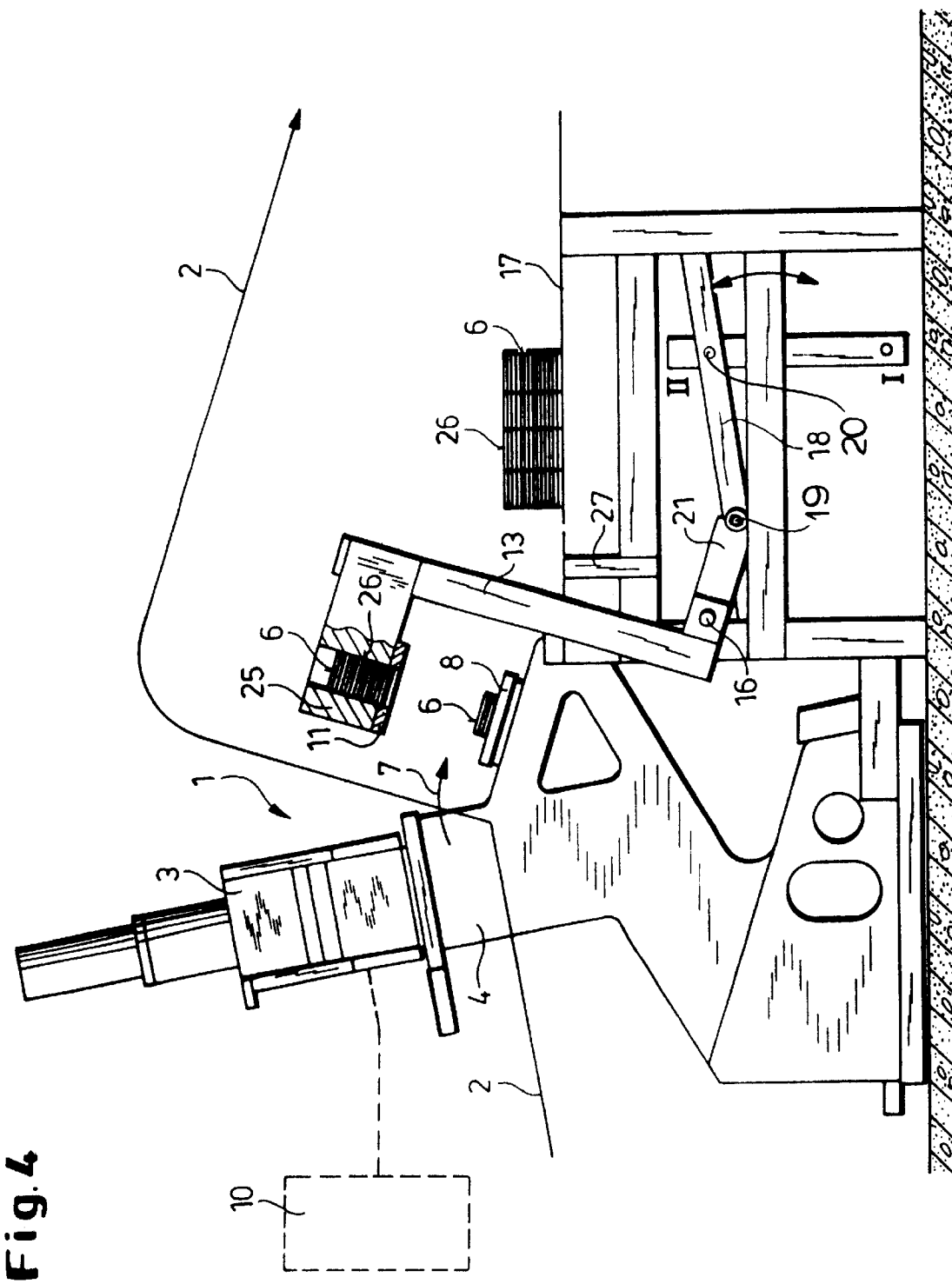
FIG. 4 is a view similar to FIG. 1 with the apparatus set up for the stacking of covers.
Figure 5:
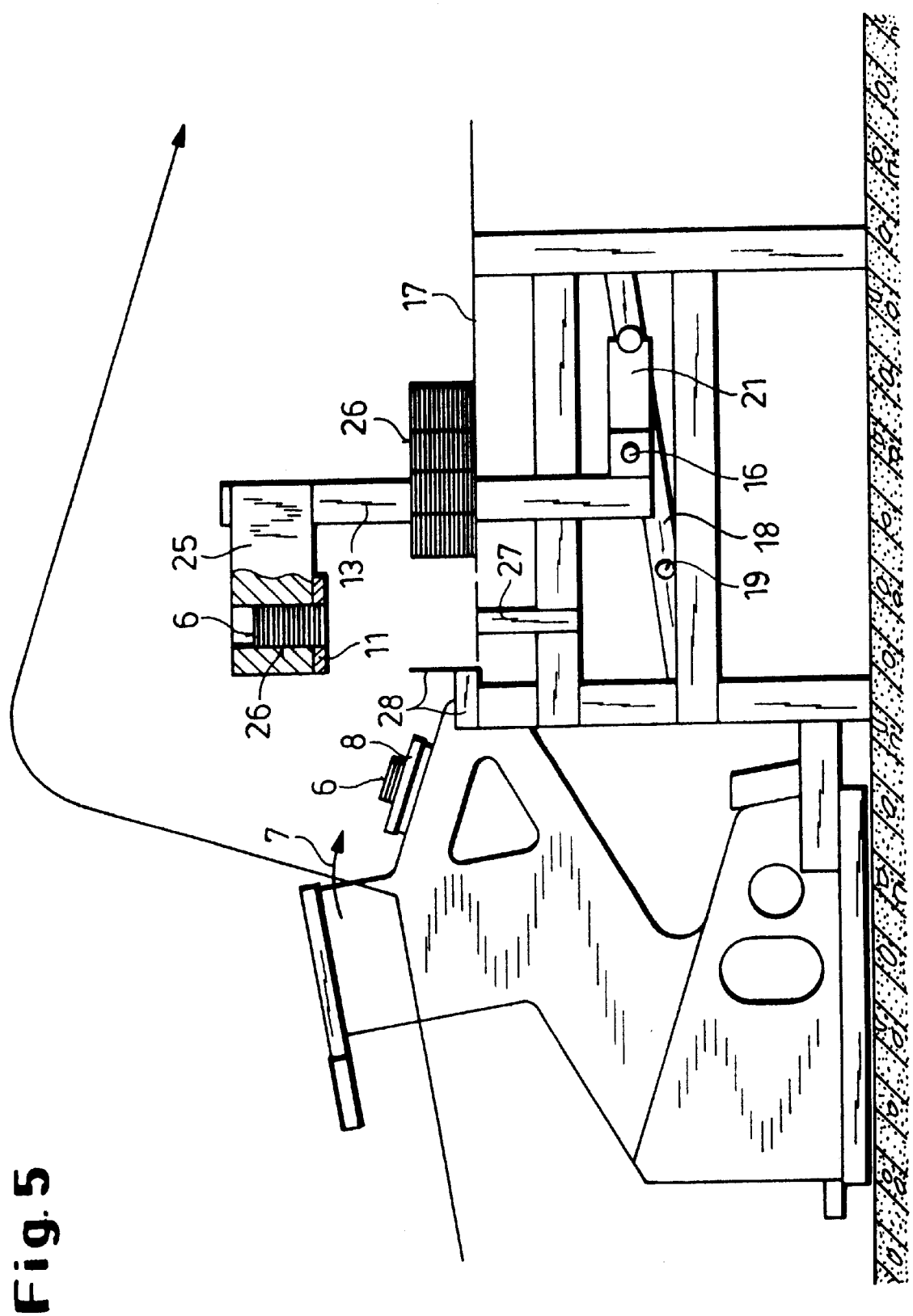
FIG. 5 is a view similar to FIG. 4 but showing the destacking position of the upper plate and the pivot arm.

The pivot arm 13 is constrained to swing between these two positions by a slide guided on a guide bar 18 which has two positions, namely, the inclined position shown in FIGS. 1–3 and indicated as position I in FIG. 1 and the practically horizontal position shown in FIGS. 5, etc., referred to as position II. A detent arrangement 20 can releasably lock the guide bar 18 in these positions and in FIG. 8 the guide bar has been shown with the detent indicated in broken lines.

The pivot arm 13 has its slider 21 guided by rollers 22 on the guide bar 18, the rollers being journaled on the slider. The slider is pivotable about a pin 23 in the slide arm 13 (see FIG. 9). The slider 21 can be shifted from position I to position II in which a pusher 24 comes into play to press the article stacks 12 from the cavity of the upper stacking plate 11 and onto the table 17. Since the stroke of the pusher 24 is relatively small, in conjunction with the movement of the beam 25 of the upper stacking plate 11, it can move the columns 12 of cups 5 onto the table 17 and pass through the forming cavities on member 11. The stacking plate 11 and its carrier 25, upon traveling of the slider 21 along the beam 18, can swing past the pusher 24 from the position shown in FIG. 1 to the position shown in FIG. 2. Upon withdrawal of the pusher 24 and discharge of the columns of cups 5 (FIG. 3), the arm 13 is swung back to the position shown in FIG. 1 and the process is repeated.

The stacking system and article collection system which withdraws the thermoformed articles from the thermoforming machine on the one hand and forms stacks of them on the other hand, has been shown in another embodiment in FIGS. 4–7 in which reference numerals have been used which are identical in part to those used in FIGS. 1–3 to represent similar structure. The columns of articles are here represented at 26 and are picked up by the upper stacking plate 11 from the lower stacking plate 8 by a pivot arm 13 on which the upper stacking plate can move as has been described in connection with FIGS. 1–3.

For stacking up covers or the like in contrasts to the stacking of columns of nested containers, the guide bar 18 is here raised about its horizontal axis 19 into its cover stacking position II in which it is retained by the detent 20. In this position the pivot arm 13 can be swung from its inclined position (FIG. 4) into a position in which the main shank of the pivot arm 13 is vertical (FIG. 5). In the inclined position, the covers 6 are taken up by the upper stacking plate 11 which can move toward and away form the lower stacking plate 8 along the inclined pivot arm 13.

As soon as the pivot arm 13 reaches the position shown in FIG. 5 in which its main shank is vertical, the transverse body 25 with the upper sacking plate 11 can be lowered adjacent the previously deposited columns 26 to lay the new column 26 down on a finger plate 27.

Figure 6:
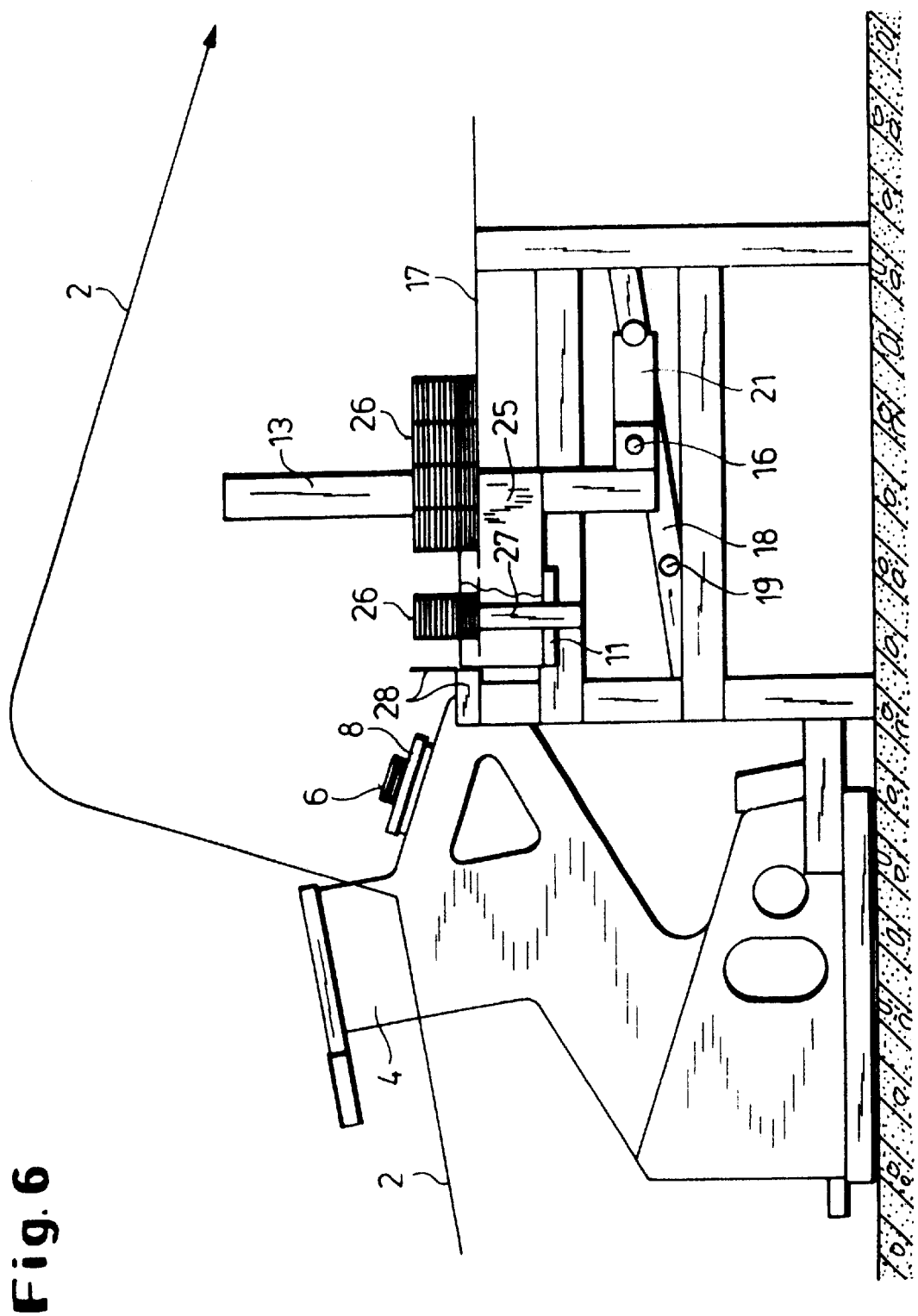
FIG. 6 is a view of the apparatus of FIGS. 4 and 5 with the upper stacking plate lowered beneath a finger plate on which the stacks of covers are received.

After the new column 26 is deposited on the finger plate 27, the member 25 can pass below the finger plate and the receiving plate 17. This is shown in FIG. 6.

Figure 7:
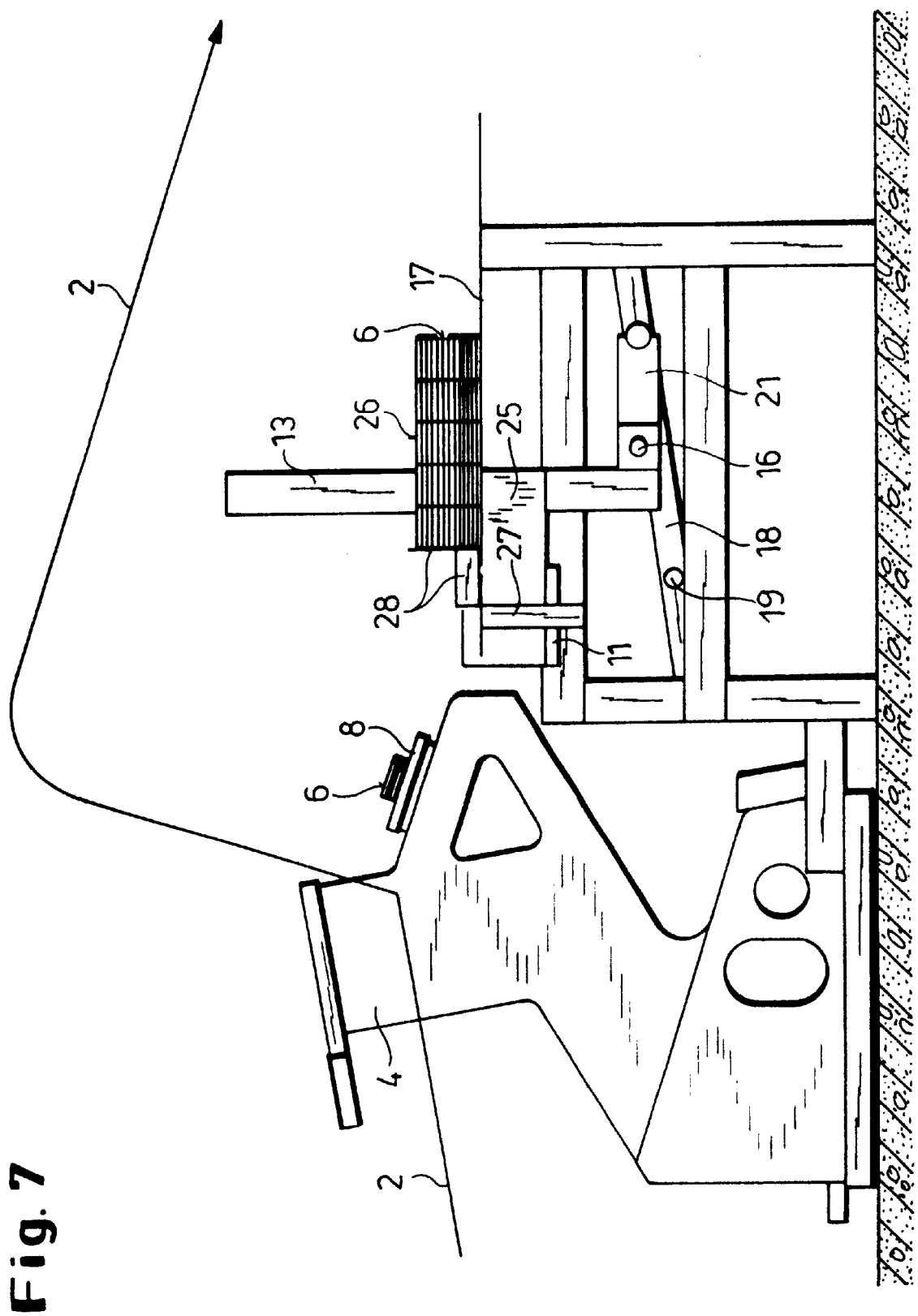
FIG. 7 is a view similar to FIG. 6 showing the position of the apparatus after the stacks of covers have been brought together.

As can be seen from FIG. 7, the pusher 28 can then be displaced to the right to push the new stack 26 together with the previously formed stack onto the receiving plate 17.

The action of the pivot arm 13 which is swingable at 16 on a carriage 15 or frame structure displaceable upon the framework 14 of the machine and the slider 21 which rides via rollers 22 on the bar 18 has been shown in detail in FIGS. 9 and 10.

Figure 12:
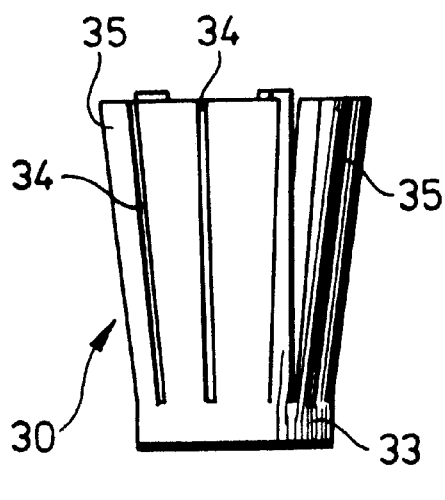
FIG. 12 is an elevational view of one of the lifters.

Both the upper and lower stacking plates 8 and 11 are fitted with lifters 30 at the respective passages or cavities 29 (see FIG. 11) which are represented at the left side of FIG. 11 for the lower stacking plate 8 and at the right side in FIG. 11 for the upper stacking plate 11. The lifters are shown in their design for engagement of cups 5. The lifters 30 are formed as independent retainers for the articles, meaning that the operation of the lifters do not depend on instructions from the programmed control system of the machine. They are composed of elastically yieldable material and widen, of course, in a funnel-like manner as shown in FIG. 12 in the stacking system for cups which has been illustrated in detail in FIG. 10.

Figure 13:
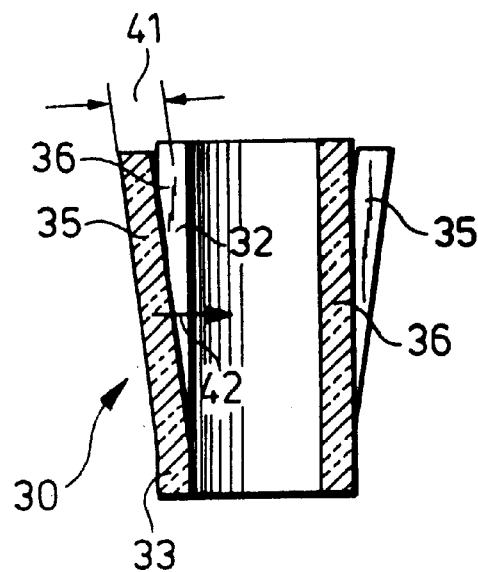
FIG. 13 is an axial section of one of the lifters.
Figure 14:
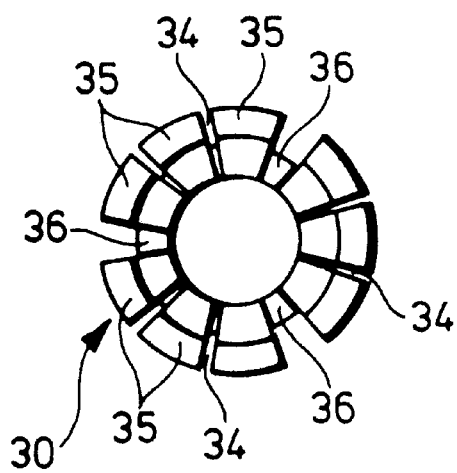
FIG. 14 is a plan view of one of the lifters.

A tubular sleeve has longitudinal slits 34 (FIG. 12) running from its widened upper end to its lower end 33 formed only as a continuous cylindrical portion holding the lamellae 35 and the tubular ribs 36 between the lamellae together. In the embodiment shown in FIGS. 12–14, a number of lamellae 35 with narrow webs 36 located between them have been provided. The lifters 30 are mounted on rods 37 or 38 by bolts 39 and are so clamped that lamellae 35 project into the path of the article and can engage as shown in FIG. 11, under the rims or lips 40 of the containers or corresponding overhangs of the covers. The heads of the bolts 39 engage the cylindrical portion 33. The containers 5 deflect the lamellae which are in their path inwardly against the intrinsic elastic foil as the container is inserted in the direction of the arrow 31, the deflection being in the direction of the arrows 42 in FIG. 11.

Once the rims 40 have been cleared of the inwardly deflected lamellae, the lamellae can spring outwardly (opposite arrow 42) to engage behind the rim. The articles can be collected in the upper or lower stacking plates as noted until the desired number has been reached, whereupon the programmed activation machine and the stacker results in a pick up of the stack by the upper stacking plate and its transfer to the table 17 as has been noted. (see FIGS. 1–3). The motor drives for member 25 on member 30 and for the pivot arm 13 have not been shown.

We claim:

1. A stacking apparatus for a thermoforming machine having an intermittent foil transport, an upper forming die and a lower forming die for producing selectively a series of deep-drawn cups and covers, said apparatus comprising:

a stacking-apparatus support;

a lower stacking plate on said support for receiving deep-drawn articles produced by said thermoforming machine;

an upper stacking plate movable along a path including a position in which the upper stacking plate is juxtaposed with said lower stacking plate and complementary thereto for receiving deep-drawn articles from said lower stacking plate and for retaining a column of said articles;

a pivot arm mounted upon said support and carrying said upper stacking plate, said upper stacking plate being raisable and lowerable on said pivot arm;

a carriage to which said pivot arm is articulated for swingable movement of said pivot arm about an arm pivot on said carriage;

a slider having rollers and coupled with said pivot arm;

a guide bar swingably mounted at a horizontal pivot axis on said support and engaged by said rollers for guiding said slider therealong whereby a column of said articles on said upper stacking plate is swingable from a position wherein said articles are collected from said lower stacking plate into a position in which said articles are deposited on a surface; and means for securing said guide bar selectively in a first angular position about said horizontal pivot axis in which said upper stacking plate is constrained to deposit columns of said covers forming said articles in a vertical orientation on said surface and columns of said cups forming said articles in a horizontal orientation on said surface.

2. The stacking apparatus defined in claim 1 wherein said guide bar is provided with detent means for selectively retaining said guide bar in upper and lower positions thereof.

3. The stacking apparatus defined in claim 2, further comprising a pusher on said support for displacing said columns along said surface.

4. The stacking apparatus defined in claim 3 wherein each of said plates is provided with automatic lifters composed of elastic material and having radially resiliently deflectable portions engageable with said articles.

5. The stacking apparatus defined in claim 4 wherein each of said lifters is a tubular funnel-shaped sleeve widening in a direction of stacking of the respective articles.

6. The stacking apparatus defined in claim 5 wherein each of said sleeves is formed with a plurality of slits defining outwardly projecting lamellae between them, said slits extending from one end of each sleeve to a cylindrical continuous portion at an opposite end thereof.

7. The stacking apparatus defined in claim 6, further comprising control means for counting a number of said articles accumulated in a respective column and actuating said arm upon the count reaching a predetermined number.

8. The stacking apparatus defined in claim 7 wherein said machine has a programmable controller with a memory and said control means forms part of said programmable controller.

9. The stacking apparatus defined in claim 1, further comprising a pusher on said support for displacing said columns along said surface.

10. The stacking apparatus defined in claim 1 wherein each of said plates is provided with automatic lifters composed of elastic material and having radially resiliently deflectable portions engageable with said articles.

11. The stacking apparatus defined in claim 10 wherein each of said lifters is a tubular funnel-shaped sleeve widening in a direction of stacking of the respective articles.

12. The stacking apparatus defined in claim 11 wherein each of said sleeves is formed with a plurality of slits defining outwardly projecting lamellae between them, said slits extending from one end of each sleeve to a cylindrical continuous portion at an opposite end thereof.

13. The stacking apparatus defined in claim 1, further comprising control means for counting a number of said articles accumulated in a respective column and actuating said arm upon the count reaching a predetermined number.

14. The stacking apparatus defined in claim 13 wherein said machine has a programmable controller with a memory and said control means forms part of said programmable controller.

* * * * *